US009314933B2

(12) United States Patent
Calisti et al.

(10) Patent No.: US 9,314,933 B2
(45) Date of Patent: Apr. 19, 2016

(54) ROBOT HAVING SOFT ARMS FOR LOCOMOTION AND GRIP PURPOSES

(75) Inventors: Marcello Calisti, Valfabbrica (IT); Andrea Arienti, Leghorn (IT); Michele Giorelli, Rutigliano (IT); Barbara Mazzolai, Castiglioncello (IT); Cecilia Laschi, Leghorn (IT); Paolo Dario, Lorenzana (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 393 days.

(21) Appl. No.: 14/114,833

(22) PCT Filed: May 2, 2012

(86) PCT No.: PCT/IB2012/052182
§ 371 (c)(1),
(2), (4) Date: Dec. 12, 2013

(87) PCT Pub. No.: WO2012/150551
PCT Pub. Date: Nov. 8, 2012

(65) Prior Publication Data
US 2014/0083230 A1    Mar. 27, 2014

(30) Foreign Application Priority Data

May 3, 2011    (IT) .............................. FI2011A0091

(51) Int. Cl.
B25J 18/06    (2006.01)
B25J 9/10    (2006.01)
B25J 15/12    (2006.01)

(52) U.S. Cl.
CPC *B25J 18/06* (2013.01); *B25J 9/104* (2013.01); *B25J 15/12* (2013.01); *Y10S 901/21* (2013.01); *Y10T 74/20323* (2015.01)

(58) Field of Classification Search
CPC ............ B25J 18/06; B25J 9/104; B25J 15/12; Y10T 74/20323
See application file for complete search history.

(56) References Cited

U.S. PATENT DOCUMENTS 3,343,864 A * 9/1967 Baer .................... B25J 15/0009
                                              294/119.3
4,794,912 A * 1/1989 Lia ..................... G02B 23/2476
                                              600/152

(Continued)

FOREIGN PATENT DOCUMENTS

JP          04194406       7/1992
WO          98/49976       12/1998

OTHER PUBLICATIONS

PCT International Search Report mailed on Jun. 25, 2012 for PCT/IB2012/052182 filed on May 2, 2012 in the name of Scoula Superiore Di Studi Universitari E Di Perfezionamento Sant'Anna.

(Continued)

*Primary Examiner* — David M Fenstermacher
(74) *Attorney, Agent, or Firm* — Steinfl & Bruno LLP

(57) ABSTRACT

A robot having an overall structure inspired by the *Octopus vulgaris* is described. The robot has soft arms joined in a radial manner to a central support. The soft arms have the capability of lengthening, shortening and wrapping around in a coil-shape manner. The extremely simple movements and coordination of the soft arms are effective because of the interaction between the single actions. For example during locomotion, while some arms act as a support for stability, the others provide for thrusting allowing the robot to advance. Once near the target, some arms provide for stability whereas the others can bend so as to wrap around and transport external entities.

12 Claims, 2 Drawing Sheets

(56) References Cited

U.S. PATENT DOCUMENTS

| | | | | |
|---|---|---|---|---|
| 5,080,000 | A | * | 1/1992 | Bubic ............... B25J 18/06 294/119.3 |
| 5,083,498 | A | * | 1/1992 | Sato ............... F15B 15/125 73/731 |
| 5,156,081 | A | * | 10/1992 | Suzumori ............ B25J 15/12 91/525 |
| 5,251,538 | A | * | 10/1993 | Smith ............... F16J 3/06 92/34 |
| 5,385,080 | A | | 1/1995 | Suzumori |
| 6,718,766 | B2 | * | 4/2004 | Seto ............... B25J 9/142 60/476 |
| 8,571,711 | B2 | * | 10/2013 | Jacobsen ............ B08B 9/045 180/9.21 |
| 8,935,014 | B2 | * | 1/2015 | Jacobsen ............ F41H 13/00 700/245 |
| 2007/0144299 | A1 | | 6/2007 | Okazaki |

OTHER PUBLICATIONS

PCT Written Opinion mailed on Jun. 25, 2012 for PCT/IB2012/052182 filed on May 2, 2012 in the name of Scoula Superiore Di Studi Universitari E Di Perfezionamento Sant'Anna.

Calisti, M., et al., Study and fabrication of bioinspired octopus arm mockups tested on a multipurpose platform, Proc. of 2010 $3^{rd}$ IEEE RAS & EMBS 2010, 461-466.

McMahan, W., et al., Robotic Manipulators Inspired by Cephalopod Limbs, Proc. of the Canadian Engineering Education Assoc. 2011, pp. 1-10.

Menciassi, A., et al., Design, Fabrication and Performances of a Biomimetic Robotic Earthworm, Proc. of 2004 IEEE Int'l. Conference on Robotics & Biomimetics 2004, 274-278.

Menciassi, A., et al., Bio-inspired solutions for locomotion in the gastrointestinal tract: background and perspectives, Phil. Trans. R. Soc. Lond. 2003, 361: 2287-2298.

Shibata, M., et al., Crawling by Body Deformation of Tensegrity Structure Robots, 2009 IEEE International Conference on Robotics and Automation, 4375-4380.

Steltz, E., et al., JSEL: Jamming Skin Enabled Locomotion, The 2009 IEEE/RSJ International Conference on Intelligent Robots and Systems, 5672-5678.

Sugiyama, Y., et al., Crawling and Jumping of Deformable Soft Robot, Proc. of 2004 IEEE/RSJ Int'l. Conference on Intelligent Robots & Systems 2004, 3276-3281.

Trivedi, D., et al., Soft robotics: Biological inspiration, state of the art, and future research, Appl. Bionics & Biomech. 2008, 5: 99-117.

Tsukagoshi, H., et al., Active Hose: an Artificial Elephant's Nose with Maneuverability for Rescue Operation, Proc. of 2004 IEEE Int'l. Conference on Robotics & Automation 2001, 2454-2459.

* cited by examiner

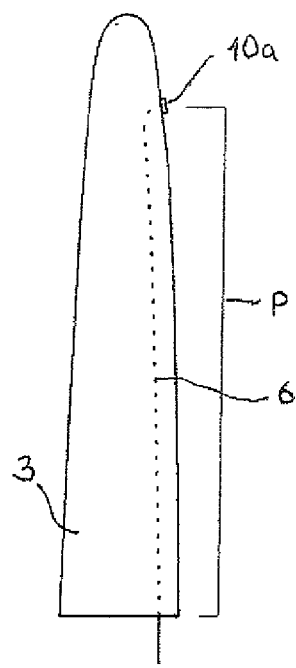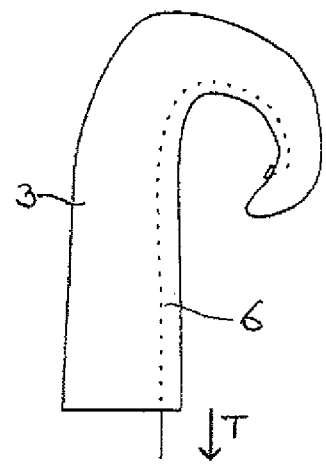
Fig. 4a           Fig. 4b
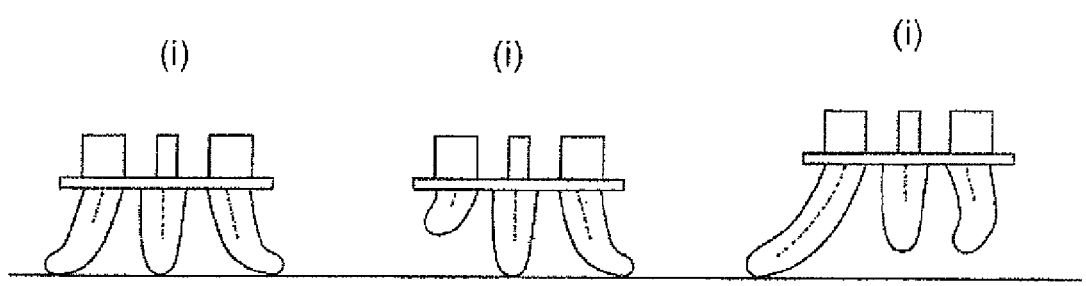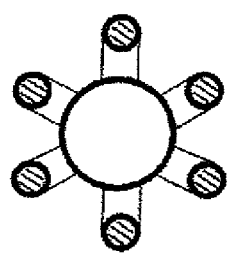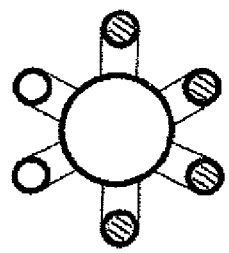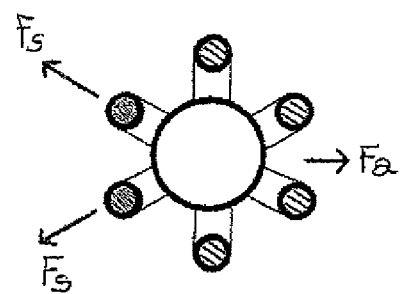
Fig. 5

ROBOT HAVING SOFT ARMS FOR LOCOMOTION AND GRIP PURPOSES

CROSS REFERENCE TO RELATED APPLICATIONS

The present application is the US national stage of International Patent Application PCT/IB2012/052182 filed on May 2, 2012 which, in turn, claims priority to Italian Patent Application FI2011A000091 filed on May 3, 2011.

DESCRIPTION

1. Field Of The Invention

The invention refers in general to the field of so called soft robotics and in particular concerns a robot with soft arms for locomotion and grip purposes.

2. Background Of The Invention

As known, the term "Soft-robotics" identifies the field of robotics that concerns continuous robots, mainly in the form of limbs or arms or arm units, made from soft materials, like silicone or rubber, and soft actuators, such as electroactive polymers, artificial pneumatic muscles, cables. Soft-robots are inspired by nature, especially by animals with a soft body, such as octopuses or worms, or soft parts of animals, such as the tongue of mammals or the trunk of elephants. Soft-robots have the property of continuously bending themselves because they have infinite degrees of freedom (DoF). Thanks to their compliance, they are capable of adapting to the shape of obstacles and they can manipulate fragile objects without damaging them. Soft-robots do not have an actuator for each DoF, and therefore they can belong to the category of so called underactuated robots. Due to the underactuation, the distributed loads like gravity, can have a considerable effect on the structure of the robot and therefore the effect of such loads cannot be neglected.

Three main characteristics distinguish soft-robots from conventional hard-robots with joints and rigid structure. The first characteristic consists in the fact that the actuators of soft-robots are integrated in the structure and arranged in it, and therefore the deformations influence the actuators themselves. The second characteristic is that the entire structure of a soft-robot, in particular when in the form of an arm, is involved in the function of gripping and manipulating items/entities with different dimensions, and therefore there are no end-effectors, such as gripping tools, since such tools consist of the arm itself in its entirety. The last characteristic is that the locomotion of a soft-robot requires that in every moment a substantial part of its structure is in contact with the support surface.

An overview of the state of the art in the field of soft robotics is illustrated in D. Trivedi et al., *Soft robotics: biological inspiration, state of the art, and future research*, Applied Bionics and Biomechanics Vol. 5, No. 3, September 2008, 99-117.

Currently a significant effort is put into producing "soft-robots" in the scientific field. These robots can be essentially classified into robots that are capable of moving or robots that are capable of manipulating, but the two functions have not yet been obtained together.

Robots with locomotion capability are described in Sugiyama Y et al., *Crawling and jumping of deformable soft robot*, Proc. IEEE/RSJ Int. Conf. on Intelligent Robots and Systems (Sep. 28-Oct. 2, 2004, Sendai, Japan) vol. 4 pp. 3276-81 and in Shibata M et al., *Crawling by body deformation of tensegrity structure robots*, IEEE Int. Conf. on Robotics and Automation (May 12-17, 2009, Kobe, Japan) pp. 4375-80. The robotic structure described in these documents consists of a deformable outer ring in which shape memory alloy (SMA) springs are radially fixed, like in a spoke wheel, said springs having a contraction and lengthening which allows the structure to move and jump. A worm-shaped robot capable of moving on different surfaces and climbing up different slopes is described in Menciassi A et al., *Bio-inspired solutions for locomotion in the gastrointestinal tract: background and perspectives*, Phil. Trans. R. Soc. 2003 A 361 2287-98 and in Menciassi A et al., *Design, fabrication and performances of a biomimetic robotic earthworm*, Proc. IEEE Int. Conf. on Robotics and Biomimetics (Aug. 22-26, 2004 Shenyang, China) pp. 274-78. Such a robot has tiny hooks that allow a movement in one direction whereas they prevent it in the opposite direction. The robot lengthens, thanks to SMA elements, with a first part of its structure, fixes itself to the ground passively thanks to the hooks, and then it pulls the rear part, producing a slow movement in a straight line. An interesting example of "soft robot" that is capable of changing its shape and, thanks to this, move, is presented in Steitz E et al., *Jsel: jamming skin enabled locomotion*, IEEE/RSJ Int. Conf. on Intelligent Robots and Systems (Oct. 11-15, 2009, St. Louis, USA) pp. 5672-77. This robot consists of a number of triangular chambers, arranged essentially so as to form a sphere, which can be inflated independently from one another. By inflating the chambers in contact with the ground, and therefore deforming them like when a balloon is inflated, whereas the others are left unchanged, the robot is able to advance approximately in the desired direction.

These robots can move, but none of them are capable of interacting with external entities to carry out, for example, a grip.

Recently, soft manipulators or rigid manipulators with soft capability, for adapting to external items or for their being without joints, have been developed. The most important results have been obtained with the Active Hose (see Tsukagoshi H et al., *Active hose: an artificial elephant's nose with manoeuvrability for rescue operation*, Proc. of Int. Conf. on Robotics and Automation, 2001, vol. 3 pp. 2454-59) and with the OctArm (see McMahan W et al., *Robotic Manipulators Inspired by Cephalopod Limbs*, CDEN Design Conference, 2004 (Montreal, Canada).

The Active Hose is a manipulator inspired by the trunk of an elephant, used for rescue operations. The OctArm is currently considered the most effective soft manipulator. It is continuous and light, capable of manipulating and lifting various heavy objects, potentially also having different shapes. In Calisti M. et al., *Study and fabrication of bioinspired octopus arm mockups tested on a multi-purpose platform*, IEEE/RAS-EMBS Int. Conf. on Biomedical Robotics and Biomechatronics (Sep. 26-29, 2010 Tokyo, Japan) an arm of silicone and cables are described having the capability of bending, shortening and wrapping around objects, without the possibility however of lengthening, which is essential in order to allow the thrust for the movement.

A soft manipulator is also disclosed in U.S. Pat. No. 5,080,000, having arms with a spinal frame of tubes that, when pressurized, expand, and when released, contract. Linear and helical actuators cooperate to make the arm twist and bend. However, this structure is unsuitable for ensuring any locomotion capabilities, lacking of the required functionality and constructive simplicity. Moreover, the bending requires the provision of the spine along substantially the whole length of the arm.

SUMMARY OF THE INVENTION

The general object of the present invention is to provide a robot that is mainly made up of soft arms that is capable of both locomoting and gripping objects, so that the arms can act both as manipulators and locomotion means.

One particular object of the present invention is to provide a robot of the aforementioned type equipped with arms that are capable to take on longer and shorter arrangements, and to bend to a coil.

Another object of the present invention is that of providing a robot of the aforementioned type, that is suitable for the locomotion which may or may not be of the underwater type, in which the arrangement of the arms is such as to allow the simple actions, which can be carried out by the structure of every individual arm, to be exploited in order to attain an overall coordination and integration into a complex, programmable and not random movement, like for example the lengthening of some arms rather than others, so as to move in a desired direction.

These objects are achieved with the soft-arm robot according to the present invention the essential characteristics of which are defined by appended claim 1. Further important characteristics are defined by the dependent claims.

According to an important aspect of the invention, the robot comprises a support body with a number of soft arms that are fixed to one side of the body and extend from said side. Each arm is elongated along a central axis and has an outer periphery. Each arm is actuated by first actuating means with at least one substantially inextensible first cable extending substantially parallel with the central axis and eccentrically displaced from the same axis towards the outer periphery, while first drive means exert a pulling or release action on the cable, so that in response the arm is adapted to bend itself in a substantially coil-like configuration or to resume a substantially straight arrangement. Second arm actuating means comprise for each arm a substantially inextensible second cable extending coaxially with said central axis, and second drive means for exerting a pull or release action on the second cable; in response thereto, the second arm is adapted to become shorter or longer. Control means are also provided for selectively controlling the first and second actuating means, whereby the arms are adapted to grip an entity by bending around it, and/or to make the robot locomote by synchronized lengthening and shortening of the arms.

Preferably, while the first cable is a highly flexible cable, while the second cable has a certain stiffness, i.e. is substantially rigid in the sense that it opposes a significant resistance to the bending, and can also have a certain resiliency. Still according to a preferred solution, the second cable reaches farther towards the free or distal end of the arm, while the second, central cable does not overcome half the length of the same arm.

The robot has an overall structure inspired by the *Octopus vulgaris* and the soft arms are joined in a radial manner to a central support. The soft arms have the capability of becoming longer, shorter and wrapping around in a coil-shape manner and their movements are extremely simple and their coordination is effective thanks to the interaction between the single actions, just like what happens in octopuses. For example in the movement, whereas some arms act as a support for stability, the others provide the thrust allowing the robot to move forward. Once near the target, analogously, some arms provide for stability whereas the others can bend and wrap around and transport items/entities. It is thus clear that the single arms, although incorporating the capability of moving and manipulating, find an overall efficiency in their mutual assembly and coordinated integration into a complex structure.

BRIEF DESCRIPTION OF THE DRAWINGS

The characteristics and the advantages of the soft-arm robot according to the present invention shall become clearer from the following description of an embodiment thereof given as an example and not for limiting purposes with reference to the attached drawings, in which:

FIGS. 4a and 4b show an arm in the resting position and in a bent position following traction on a first peripheral cable;

FIG. 5 schematically illustrates the advancing sequence of the robot.

DETAILED DESCRIPTION OF THE INVENTION

Figures 1, 2:
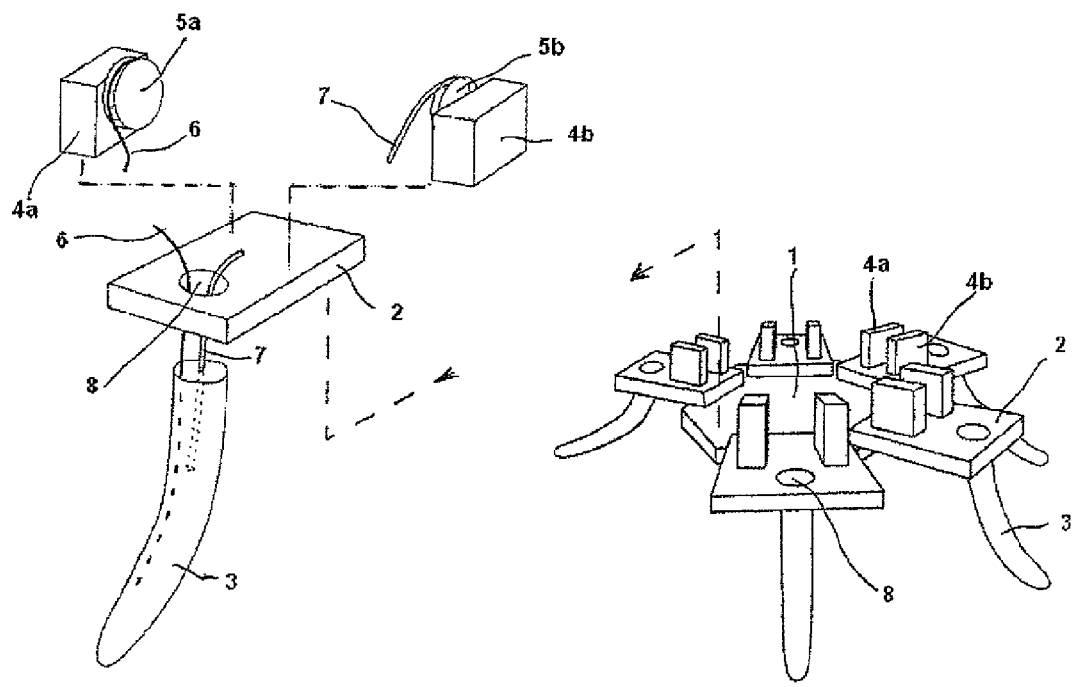
FIG. 1 schematically shows a soft-arm robot according to the present invention.
FIG. 2 is an exploded view of a soft arm of the robot of FIG. 1.

With reference to FIGS. 1 and 2, reference numeral 1 wholly indicates a generic support body, illustrated as an example in the form of a plate, to which rigid bases 2 are fixed for respective soft arms 3. The bases 2 project from the support 1 along its peripheral edge in a position that is substantially angularly equally spaced. In the illustrated embodiment the plate forming the support 1 has, as an example, the shape of a hexagon and the bases 2 of the arms 3 are each arranged at one side of the support 1, so that the robot according to the present embodiment of the invention comprises six soft arms. Of course this configuration is not essential for the purposes of the invention. For instance, a further arm can be foreseen having special functions, or the arms can be arranged according to a number groups separated by portions that are not provided with arms. The support body can also be a single compact structure such as a round disc or the like.

The arms 3 are made of a soft and relatively elastic material and have an axially elongated conical structure with a central axis and an outer periphery or peripheral surface. Particularly suitable material for the purposes of the present invention are materials that are relatively elastic like silicone or elastomers with similar viscoelastic properties (low Young's modulus) and that can undergo great deformations (even greater than 500%) without suffering from permanent damage.

Each arm 3 is fixed into a locking hole 8 formed in the respective base 2 and extends from one face thereof in a substantially perpendicular direction. The bases 2 are connected to the support 1 so that the arms 3 all extend from the same side. In FIG. 1 one of the arms 3 has been removed so as to show it in an enlarged form and an exploded form in FIG. 2.

Each base 2 acts as a support for two motors indicated with 4a (first motor) and with 4b (second motor) connected to a respective pulley 5a and 5b on which respective actuating (first and second) cables 6 and 7 are wound.

Figures 3A, 3B:
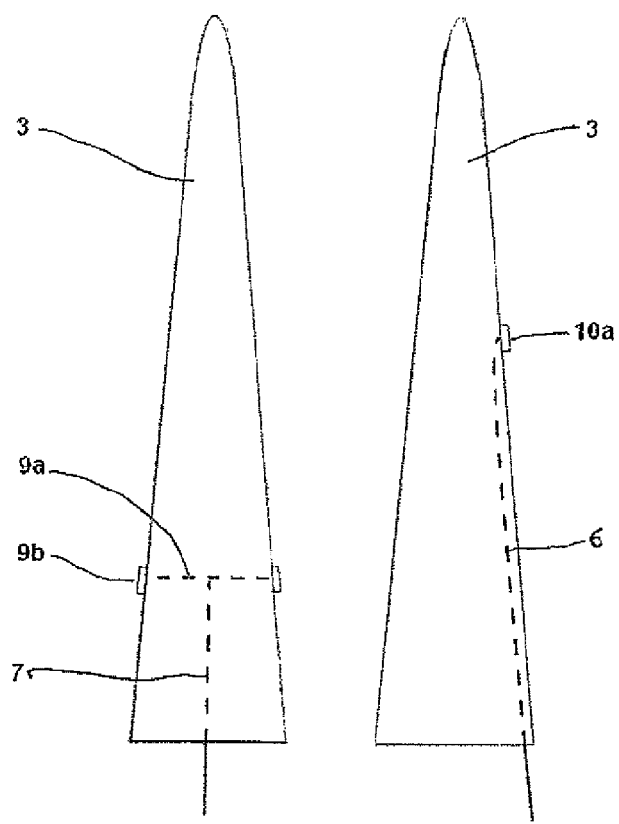
FIGS. 3a and 3b schematically show an arm of the robot of FIG. 1 in two views rotated by 90° and the arrangement of the relative actuation cables.

As shown in FIGS. 3a and 3b, the second actuating cable 7, or central cable, is made from a substantially rigid material, equipped with limited flexibility, sufficient so as to allow it to be wound around the respective pulley 5b, even if not in perfect contact. The central cable 7 extends axially along the arm 3 for a certain length and it is fixed with its end to a transverse fixing structure 9a, 9b. The second drive means can, as an alternative, comprise a motor and a crank and rod transmission connecting the motor to the first end of the second cable 7

The first or peripheral actuating cable 6 is made from highly flexible material, for example nylon, and is wound in a loose manner on the pulley 5a so as to compensate for the lengthening of the arm when the central cable 7 is actuated. The lateral cable 6 extends in an eccentric position for a certain length inside the arm 3, preferably parallel to a generatrix thereof and close to the outer periphery, and it is also fixed with its distal or second end to a fixing structure 10a thereof foreseen on the lateral surface, the first end being that connected to the first drive means (motor 4a and pulley 5a). In particular the lateral cable 6 is preferably incorporated in the arm immediately below a surface layer of the forming material.

The peripheral cable 6 extends for a greater length of the central cable 7 in the arm 3. In particular, as an example, the central cable 7 extends from its first, drive-connection end, for less than half of the length of the arm 3 and its end enclosed in the silicone material of the arm is connected at the second, distal end to three short cables 9a made from nylon through heat-shrinking sheaths and gluing. The cables 9a, extending radially with respect to the axis of the cone and angularly equidistant, are pushed out from the arm and are fixed in respective button-shaped or disc-shaped elements 9b equipped with at least two holes through which each cable is passed and tied. The peripheral cable 6 extends, on the other hand, for more than half of the length of the arm and follows the generatrix of the cone until, in the desired position, it is pushed out from the silicone and is thus wound in the button-shaped fixing element 10a, in the same way as the cables 9a.

Of course, one or more first cables 6 can be foreseen, arranged for example angularly equally spaced along the lateral surface. In this case each peripheral cable 6 can be equipped with its own actuator or, in the case of two cables extending in diametrically opposite positions, they can be coupled with the same pulley, so that, while a cable is wound at the side of the bend, it is unwound at the opposite side.

The central second cable 7 is suitable for making the arm longer and shorter, whereas the peripheral eccentric cable 6 (or cables) allows a substantially coil-like wrapping around in the direction defined by their arrangement inside the arm itself. FIGS. 4a and 4b show the effect of the application of a traction/pulling force, indicated with T, to the first cable 6 corresponding to a wrapping around of the cable on the respective pulley 5a, which causes the bending of the cable itself from the side where it extends along the surface of the arm. The area of the arm with which it is possible to achieve the grip substantially begins at the base of the arm and ends at the point in which the cable 6 is fixed to the fixing structure, whereby, thanks to the conical structure of the arm, the latter bends itself, thus being arranged according to a substantially coil-like configuration which easily obtains a grip without having to apply particular manoeuvres. Thanks to the elasticity of the material forming the arm, the latter automatically returns into its extended position when the traction force exerted by the lateral cable 6 is released.

Moreover, according to the presence of one or more first eccentric cables, each arm can curve in different directions. Therefore by coupling the redundancy of the arms with the variability of bending directions of every single arm, the robot can achieve grips that can be adapted and that are effective in non structured environments.

The coupling of many arms equipped with the same gripping capability makes it possible to select the arm to be used according to the position of the item/entity to be gripped, irrespective of the orientation of the robot with respect to the item itself.

The winding and the unwinding of the central cable 7 produces a shortening and, respectively, a lengthening of the soft arm 3 with respect to the base 2 to which it is fixed. Thanks to the lengthening and to the resistance of the central cable 7, the robot exerts a thrust on the ground and moves forward with a bouncy stride for each single thrust. As shown in FIG. 5, the actuation of the central cables of the arms is coordinated so as to achieve the stabilisation of the robot with the arms which do not thrust, whereas the others become shorter and longer. The figure mentioned shows, in side view and in plan view, one example of coordination for six arms, during three consecutive steps: (i) resting, (ii) preparation for thrust, and (iii) propulsion. In position (i) all the arms are stretched out half way and the robot is still. In position (ii) the arms which must provide for the thrust become shorter, whereas the others keep the robot stable. In position (iii) the arms dedicated to the movement become longer exerting a thrust on the ground which moves the robot. The directions in which the robot can move are therefore those of action of the arms or the resultant in the case of thrust produced by many arms. At the end of the propulsive step the robot returns into position (i) and the cycle is repeated.

The plan views associated with the side views of FIG. 5 of the robot in the three locomotion steps described above highlight the condition of maximum lengthening (section of the arms in thin broken line), of intermediate extension (wide broken line) and shortened (white section) of the arms in the three positions. Also the effect on the locomotion of the robot of the thrust action exerted by two adjacent arms is illustrated, (arrows Fs, thrust direction, and arrow Fa, forward movement direction).

In aquatic environments, where the floating component contributes to decreasing the weight of the robot, it is possible to obtain a more effective forward locomotion.

The coordination of the arms for gripping purposes is analogous to that presented for the locomotion: according to the situation it is possible to select which arms act as stabilisers for the robot and which can carry out different required functions (gripping, moving or holding objects). It is important to highlight that these are not mutually exclusive, but indeed due to the fact that they are combined into a single structure it is made possible to achieve complex tasks like searching for and recovering objects.

The robot is equipped with a set of sensors (not shown) which allow it to interact with the outside environment, and with the electronics (control unit) necessary for processing the information and the carrying out of the actions, based on implementations that, as such, are obvious to the skilled person. The minimum set of sensors that can be envisaged consists of a video-camera (or a sensor that can monitor the surrounding environment), for the purpose of monitoring and controlling, and an encoder for measuring the angular position of the motors. Alternatively, servo-motors can be used which are already position-controlled.

According to the applications of the robot according to the invention the necessary electronic module (also not shown) can be installed on board or remotely. In particular for structured environments, a cabled version of the robot can be made, where the motors and sensors (video-camera, encoder, etc.) is supplied with power from outside through electric cables, and in the same way the transducer signals of the encoder and of the video-camera are transmitted to the outside to a remote position through cables. In such a case, on the robot, it is foreseen for there to be only the sensors/transmitters as on board control means, whereas the electronic unit is located remotely. In particular it is equipped with a microcontroller, for managing the control of the robot for the locomotion and gripping, a power module for feeding the motors, the interfaces for reading the encoder and the video-camera, and a two-way communication module for sending data to a processing unit, which carries out the task of monitoring the robot.

In the case in which it is desired to make the robot autonomous, on the support body 1 the housings (not shown) are formed necessary for the batteries (which supply the motors and sensors) and for the electronic unit based on a microcontroller. In the same way this is equipped with interfaces for reading the encoders and the video-camera, with a power module for controlling the motors and with a module for communicating with the remote station. In this case the remote station consists of a data processor and of a module for receiving and transmitting, which processes the information essential to the robot.

It is important to stress that, also for the essential illustrated components, the characteristics can be greatly varied depending on their application. As an example, in the case in which a robot is intended for exploration of an underwater wreck for investigating purposes: although the video-camera may be per se sufficient, it is necessary to arrange light sources alongside it so as to illuminate inside the relict itself, or to use video cameras that receive different signals from the visible wave length spectrum.

Thanks to the redundancy of the arms with which the robot according to the invention is equipped, it can move in the set direction to reach a point of interest, it can collect and transport objects irrespective of their shape and structure or it can also combine various actions.

The solution proposed with the present invention makes it possible to combine the advantages of soft robotics with the efficiency of conventional robots, offering an innovative alternative to the use of robots in non-structured environments, such as the submarine environment. It moreover combines, in a single soft structure, two functions that to this moment have been separated in soft robotics: locomotion and gripping.

The present invention makes it possible to obtain a simple robot, which is cost-effective, that is capable of exploring underwater environments and recovering objects without damaging them in any way and without knowing beforehand neither the shape nor size. The arm structure does not have rigid parts or joints, it is continuous and soft. The present invention also has the advantage of a simple control for achieving extremely diversified movement and grips. The coil-like bend can be obtained with a structure that lacks an actual spinal structure (a substantial portion of the arm according to the invention lacks of the central, second cable).

The soft nature of the arms of the robot according to the invention, and therefore the consequent adaptability, makes the robot resilient to being damaged and to damaging the outside environment. The problem of not touching the bottom, rocks or objects, which can be a limit for other aquatic locomotors (so as to not cause damage or be damaged), in this case is completely overcome: whereas a conventional mini submarine for underwater recovery requires a distance from the bottom to avoid damage to the environment or to the vehicle itself, the robot presented can move in contact with the bottom without danger for itself and for the environment.

Although in the present embodiment of the invention the use has been proposed of two motors which wind up or thrust respective cables, it is clear that the actuation of the cables can be obtained by means of any type of actuator desired, for example pneumatic or linear actuators.

Variants and/or modifications can be brought to the robot with soft arms according to the present invention without for this reason departing from the scope of protection of the invention itself as defined in the following claims.

The invention claimed is:

1. A soft-arm robot comprising:
a support body;
a plurality of soft arms fixed to one side of said support body and extending from said one side of said support body, each arm of said plurality of soft arms being elongated along a central axis and having an outer periphery;
a first arm actuating means comprising, for each arm of said plurality of soft arms;
at least one substantially inextensible first cable extending substantially parallel with said central axis, eccentrically displaced from the same central axis towards said outer periphery, and
a first drive means for exerting a traction and release force on said at least one substantially inextensible first cable, whereby in response to said traction and release force by said first arm actuating means, an arm of said plurality of soft arms is configured to bend itself in a substantially coil-like configuration or to resume a substantially straight arrangement;
a second arm actuating means comprising, for each arm of said plurality of soft arms;
a substantially inextensible second cable extending coaxially with said central axis, and
a second drive means for exerting a traction and release force on said substantially inextensible second cable, whereby in response to said traction and release force by said second arm actuating means, an arm of said plurality of soft arms is configured to become shorter or longer; and
control means for selectively controlling said first and second arm actuating means, whereby the plurality of soft arms are adapted to grip an entity by bending around said entity, and/or to make the robot locomote by synchronized lengthening and shortening of said plurality of soft arms.

2. The soft-arm robot according to claim 1, wherein said plurality of soft arms have a substantially elongate conical shape and are made of a relatively elastic material.

3. The soft-arm robot according to claim 1, wherein said first arm actuating means comprises at least one substantially inextensible and flexible first cable extending in proximity with an outer peripheral surface of the each arm, said at least one substantially inextensible and flexible first cable having a first end connected with said first drive means, and a distal end fixed to an intermediate or to a distal end portion of said each arm.

4. The soft-arm robot according to claim 3, wherein said at least one substantially inextensible and flexible first cable extends along a respective generatrix of said outer peripheral surface.

5. The soft-arm robot according to claim 3, wherein said first drive means comprises a motor and an associated pulley for winding or unwinding said at least one substantially inextensible and flexible first cable.

6. The soft-arm robot according to claim 1, wherein said second arm actuating means comprises a single, substantially rigid and inextensible second cable extending along the central axis of the plurality of soft arms, said single, substantially rigid and inextensible second cable having a first end connected with said second drive means and a distal end fixed to an intermediate portion of said each arm.

7. The soft-arm robot according to claim 6, wherein said second drive means comprises a motor and an associated pulley, for at least partially winding or unwinding said single, substantially rigid and inextensible second cable.

8. The soft-arm robot according to claim 6, wherein said second drive means comprises a motor, and a crank and rod transmission connecting said motor to said first end of said single, substantially rigid and inextensible second cable.

9. The soft-arm robot according to claim 1, wherein said support body comprises a rigid base on which said first and second drive means are arranged.

10. The soft-arm robot according to claim 1, wherein said plurality of soft arms are substantially equally spaced around a periphery of said support body.

11. The soft-arm robot according to claim 1, wherein said at least one substantially inextensible first cable extends along said each arm for a length greater than that of said substantially inextensible second cable.

12. The soft-arm robot according to claim 11, wherein said at least one substantially inextensible first cable extends along said arm over more than half the length of said arm, while said substantially inextensible second cable extends within said arm for less than half of the length of said arm.

\* \* \* \* \*